Figure 1:
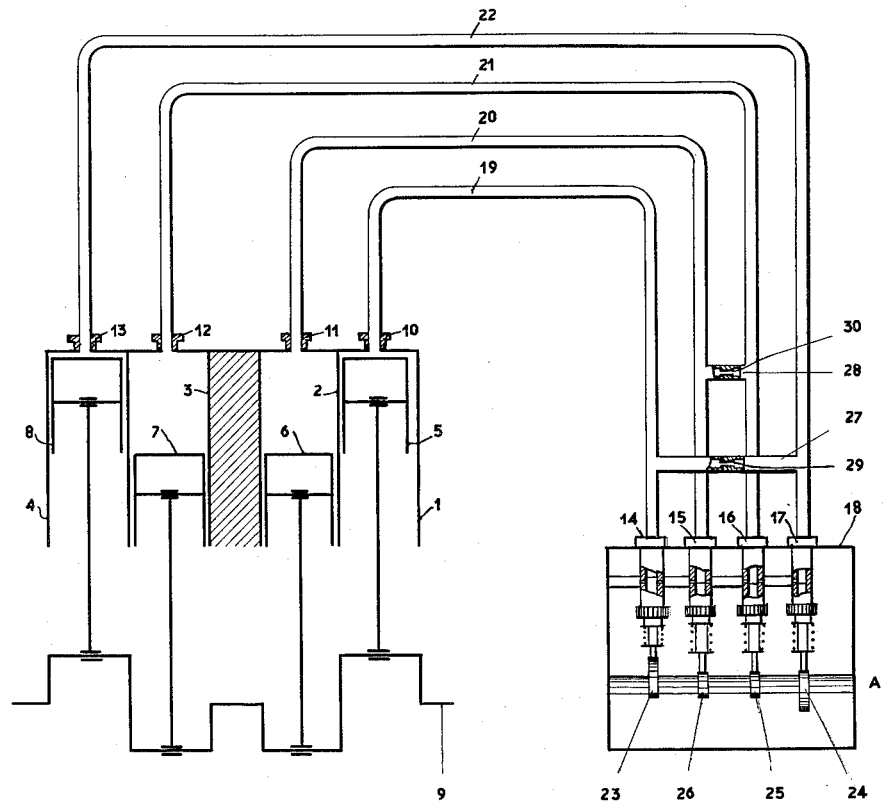

Dec. 26, 1961   G. MONNOT ETAL   3,014,466
NEW DEVICE FOR CARRYING OUT THE DOUBLE INJECTION
METHOD IN INTERNAL COMBUSTION ENGINES
Filed Dec. 2, 1959

INVENTORS
GEORGES MONNOT
ROSTISLAV VICHNIEVSKY
JACQUES OLLIER
YVES BREELLE
BY *Toulmin & Toulmin*
ATTORNEYS

United States Patent Office 3,014,466
Patented Dec. 26, 1961

3,014,466
NEW DEVICE FOR CARRYING OUT THE DOUBLE INJECTION METHOD IN INTERNAL COMBUSTION ENGINES
Georges Monnot and Rostislav Vichnievsky, Paris, Jacques Honore Gaspard Ollier, Neuilly, and Yves Louis Gabriel Breelle, Le Pecq, France, assignors to Institut Francais du Petrole des Carburants et Lubrifiants, Paris, France
Filed Dec. 2, 1959, Ser. No. 856,831
Claims priority, application France Dec. 3, 1958
4 Claims. (Cl. 123—32)

This invention relates to a new and simple device for carrying out improvements in the operation of internal combustion engines of the compression ignition type and particularly for operating such engines by means of a double-injection method.

It has been already established in a preceding patent application, Serial No. 735,479 filed May 15, 1958, now Patent 2,960,079, issued Nov. 15, 1960, assigned to the same assignee as the present application, that considerable advantages such as a smoother combustion regardless of the type of fuel employed and an increased power output at a given rate of pressure increase are obtained by a new method of double injection. According to this method a first, "carburating" fraction of the fuel charge is injected into the hot residual gases remaining in the combustion space of the cylinder toward the end of the exhaust stroke of a work cycle and a second, "igniting" injection of the remainder of the fuel charge takes place toward the end of the compression stroke of the next work cycle.

Such conditions are fulfilled, for instance, if the timing of the first "carburating" fraction and that of the main "igniting" injection are chosen in such a way that the interval between these two successive injections into the same cylinder corresponds to one complete revolution (360°) of the crankshaft.

Various feeding devices may be used for carrying out the double-injection method. For instance, two injection pumps each having the same number of cylinders as the engine can be employed for adjusting at will, and as a function of the type of fuel used, the ratio of fuel amounts introduced, respectively, by the first, "carburating" injection and the second, "igniting" injection.

However, this arrangement described in the co-pending application, supra, suffers from the drawback of being too expansive and of requiring important and complicated changes in the engine structure, due to the use of two pumps instead of only one pump. Another apparatus used for operating a motor according to the new double-injection method, and described in the co-pending application, supra, consists in providing an appropriate camshaft for a single injection pump, whereby the phase angle between the two successive injections for the same cylinder is determined. However, according to that solution the ratio in the amounts of fuel injected as a first, "carburating" portion and a second, "igniting" portion cannot be adjusted in a particular engine to different types of fuel for operating the engine.

These disadvantages are overcome by the new and useful device according to the present invention which permits to carry out the double-injection method with the known engines without requiring any substantial modification of the latter.

It is therefore an object of the present invention to provide a more simple apparatus by which a first, "carburating" portion of the fuel charge is injected into the residual hot gases remaining in the combustion space of the cylinder toward the end of the exhaust stroke of a work cycle and the remainder of the fuel charge is injected toward the end of the compression stroke of the next work cycle.

It is a further object of the invention to provide a simple apparatus by which the charge to be supplied to each cylinder is injected into the latter in two successive portions. The interval between these two corresponding injections being determined by a full revolution of the crankshaft, i.e. 360°.

It is still a further object of the invention to provide means for adjusting at will the ratio of the two successive portions of the fuel charge to be fed to the same cylinder and thereby to obtain the highest efficiency of the double-injection method whatever may be the kind of fuel used.

All these objects are accomplished by the present invention which provides a very simple device permitting to operate engines having an even number of cylinders according to the double-injection method with a time lag between the two injections corresponding to a complete revolution (360°) of the crankshaft.

One of the greatest advantages of our invention results from its direct and simple adaptability to existing engines without any complicated structural changes of the latter.

It must be emphasized particularly that no special injection pump or camshaft is required for carrying out the double-injection method but that the normal injection pump and camshaft as already used in internal combustion engines of the compression-ignition type may still be employed according to our invention without any modification. Thus an injection pump having the same number of cylinders as the engine is adapted for carrying out two injections, in two different cylinders, of appropriate amounts of fuels, so that two successive injections are made in each cylinder of the engine.

Such a result is obtained according to our invention by interconnecting each two delivery pipes of the pump which feed the injectors of two corresponding cylinders of the engine whose pistons are in the same position (i.e. at angular intervals relative to the rotation of the crankshaft of 360°).

Thus, for instance, in the case of a four-cylinder engine in which the successive order of the top dead center (TDC) of the pistons in the different cylinders (1—2—3—4) are 1—3—4—2 or 1—2—4—3 the delivery pipes of injectors of cylinders 1 and 4 on the one hand and 2 and 3 on the other hand are cross-connected.

However, such cross-connection of the delivery pipes of the injectors of the cylinders must be adapted for providing the desired dosage of the respective fuel amounts of the two successive injections into each cylinder during the same work cycle. According to our invention said dosage of the share of each injection is obtained in a very simple manner by providing each interconnecting pipe with a section-limiting device, such as for example jets, dividing plates, nozzles, cocks, valves or any other adjustable devices by which the useful section of a pipe may be reduced to the desired one. According to a preferred embodiment of our invention, applicable when the kind of fuel to be used is already known and is not expected to be frequently changed, an interconnecting pipe provided wtih a permanent zone of reduced section may be advantageously used to carry out the double-injection method. Such a permanent narrowing of the useful section of a pipe is not subject to incidental changes due to external factors as may be the case in some particular circumstances when using an adjustable device.

However, in most cases an adjustable device may be used as well as a non-adjustable element. It should be remarked that an adjustable device can be so adapted as to allow for operating the engine according to the conventional single-injection method; this can be done by completely blocking the interconnecting pipes.

The use of a section-limiting device, either adjustable or non-adjustable has many advantages such as:

The possibility of maintaining a given ratio between the two portions of the fuel charge successively injected during each cycle into the same cylinder;

The reduction of the uncontrollable effect of the shape of pipes on the ratio between the two portions of the injected total charge;

The reduction of the effect of the adjustment of the injectors on the ratio between the two portions of fuel injected.

Figure 1A:
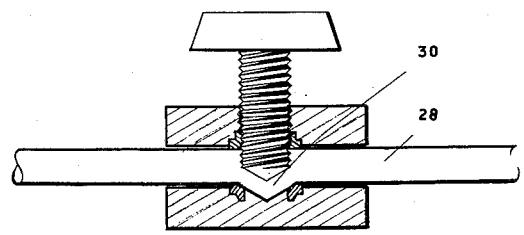

The invention is illustrated by way of examples, by the accompanying drawings, wherein FIGURE 1 is a schematic view of the apparatus of the invention and FIGURE 1a an enlarged view of adjustable section-limiting means.

Referring to these drawings more in detail, the FIGURE 1 shows a combustion ignition engine having four cylinders 1, 2, 3, and 4 in which are provided pistons 5, 6, 7, and 8 respectively, mounted on a common crankshaft 9. Each injector 10, 11, 12, and 13 of a cylinder is connected with a corresponding cylinder 14, 15, 16 and 17 of an injection pump 18 by means of a delivery pipe 19, 20, 21, and 22.

The two pistons 5 and 8 are in the same position relative to the corresponding cylinders 1 and 4 and likewise the two pistons 6 and 7 are in the same position relative to the cylinders 2 and 3, respectively. They are, however, differently positioned in the work cycle, i.e., when for example piston 5 is at the top dead center of the end of the exhaust stroke, piston 8 is at the top dead center of the end of the compression stroke or vice versa. According to the invention the two pipes 19 and 22 which deliver fuel from two cylinders 14 and 17 of the injection pump to injectors 10 and 13 respectively, when the pistons of said cylinders are pushed away by the corresponding cams 23 and 24, are cross-connected by pipe 27 which is provided with a narrower section 29. Cams 23 and 24 as shown in the figure are disposed on the camshaft at an angular interval of 180° relative to each other, since the speed of rotation of the camshaft is only one half of that of the crankshaft. This is also the case with cams 25 and 26, although it does not appear clearly from the figure, since they are positioned respectively in front of and behind the plane of the figure.

The cylinders of the pump housing the pistons corresponding to the cams 25 and 26 are connected respectively to the injectors 11 and 12 of cylinders 2 and 3 of the engine through delivery pipes 20 and 21 which are interconnected by the pipe 28, provided with a narrower section 30.

The FIGURE 1 clearly shows that, when cam 23 pushes away the corresponding piston of the pump, injection is made in the cylinder 1 of the engine through the delivery pipe 19 and simultaneously a portion of the fuel delivered by the pump to said pipe 19 is deviated through pipe 27 toward pipe 22 feeding the injector 13 of cylinder 4. Due to the interposition of the calibrated narrowing 29 of the pipe 27, the main part of the fuel charge will be injected in the cylinder 1 and the remaining portion in the cylinder 4. After a rotation of the camshaft by 180°, the cam 24 pushes away the corresponding piston of the pump, supplying a fuel charge to the cylinder 4 through pipe 22. This charge will be diveded into a main portion delivered by pipe 22 to the injector 13 of the cylinder 4 and a complementary fraction delivered through pipes 27 and 19 to the injector 10 of the cylinder 1.

Thus at 180° of interval of rotation of the camshaft two injections of fuel in different amounts are provided respectively in cylinders 1 and 4. For each complete revolution of the camshaft, i.e. for each work cycle, each cylinder 1 and 4 is therefore provided with two injections so timed that the spacing of all successive injections is the same, i.e. one half of a work cycle. These injections to the same cylinder are alternatively a "main injection" and a "supplementary injection." The relation between the fuel amounts respectively injected during the main and the supplementary injection in either the cylinder 1 or the cylinder 4 depends upon the section of the narrowing 29 which has been selected according to the kind of fuel to be used.

Similarly cams 25 and 26 successively, at 180° of interval of rotation of the camshaft, cause successive charges to be delivered to pipes 20 and 21 which are feeding injectors 11 and 12 of cylinders 2 and 3. The performances achieved by using the apparatus of the present invention, i.e. pipes interconnecting every two delivery pipes of an injection pump feeding an internal combustion engine having an even number of cylinders, said pipes being provided with calibrated narrowings for the dosage of the fuel amounts injected in each of the two successive injections during the same work cycle in the same cylinder, are the best which can be obtained by the double-injection method as described in the copending application, supra.

FIGURE 1a illustrates more in detail the use of section-limiting means providing for an adjustable narrower section 30 of the interconnecting pipe 28.

The following examples, which are not to be considered as limitative in any way, illustrate the use of the apparatus according to the invention as applied to an injection pump having four cylinders and the delivery pipes of which are cross-connected in pairs as shown in FIGURE 1. In order to obtain more demonstrative results a single piston of the pump is actioned by the corresponding cam, for instance cam 23. The fuel charge is thus delivered to the pipe 19 connected to the pipe 22 through the pipe 27 provided with the narrowing 29. The communication between the pipe 22 and the corresponding cylinder 17 of the pump is interrupted so that the feeding of pipe 22 is limited to the minor portion of the fuel charge defined in the patent, supra, as the "carburating" fraction and that the feeding of pipe 19 consists exclusively of the main portion of the fuel, defined in the same co-pending application as the "igniting" fraction.

EXAMPLE I

This example relates to a first set of tests made with gas oil as a fuel. The pump being operated at its highest delivery rate, its speed, expressed as the number of revolutions per minute, is caused to vary within a large range of values. The internal section of the calibrated narrowing is 0.5 millimeters, and each injector is adjusted to a pressure of 150 kg./cm.$^2$.

The discharge rate per minute of the injector is registered and the corresponding share of the "carburating" (or minor) fraction of the fuel charge is computed.

The results thus obtained are given in the following table.

*Table 1*

| Speed of the pump (revolutions per minute) | Discharge rate (cm.³/min.) | | | Share of the carburating fraction (percent of total charge injected) |
| --- | --- | --- | --- | --- |
| | Igniting Injection | Carburating Injection | Total Injection | |
| 1,000 | 190 | 86 | 276 | 31.2 |
| 900 | 174 | 72 | 246 | 29.3 |
| 800 | 154 | 58 | 212 | 27.4 |
| 700 | 141 | 41 | 182 | 22.6 |
| 600 | 126 | 32 | 158 | 20.3 |

EXAMPLE II

Operating conditions are the same as according to Example I but the calibrated narrowing used has an internal section of 0.6 millimeters. The results obtained are summarized in the table below:

Table II

| Speed of the pump (revolutions per minute) | Discharge rate (cm.³/min.) | | | Share of the carburating fraction (percent of total charge injected) |
|---|---|---|---|---|
| | Igniting Injection | Carburating Injection | Total Injection | |
| 1,000 | 162 | 116 | 278 | 41.7 |
| 900 | 144 | 100 | 244 | 41.0 |
| 800 | 132 | 80 | 212 | 37.8 |
| 700 | 120 | 68 | 188 | 36.2 |
| 600 | 108 | 50 | 158 | 31.6 |

EXAMPLE III

Operating conditions are the same as according to Example I, except that the calibrated narrowing has an internal section of 0.8 millimeters. The results obtained are summarized in the following table:

Table III

| Speed of the pump (revolutions per minute) | Discharge rate (cm.³/min.) | | | Share of the carburating fraction (percent of total charge injected) |
|---|---|---|---|---|
| | Igniting Injection | Carburating Injection | Total Injection | |
| 1,000 | 148 | 132 | 280 | 47.2 |
| 900 | 134 | 114 | 248 | 46.0 |
| 800 | 120 | 96 | 216 | 44.5 |
| 700 | 112 | 78 | 190 | 41.0 |
| 600 | 94 | 60 | 154 | 39.0 |

EXAMPLE IV

Operating conditions are the same as according to Example I, except that the calibrated narrowing has an internal section of 1.0 millimeters. Results obtained are summarized in the following table:

Table IV

| Speed of the pump (revolutions per minute) | Discharge rate (cm.³/min.) | | | Share of the carburating fraction (percent of total charge injected) |
|---|---|---|---|---|
| | Igniting Injection | Carburating Injection | Total Injection | |
| 1,000 | 144 | 140 | 284 | 49.3 |
| 900 | 130 | 124 | 254 | 49.0 |
| 800 | 116 | 108 | 224 | 48.3 |
| 700 | 106 | 90 | 196 | 46.0 |
| 600 | 88 | 74 | 162 | 45.7 |

EXAMPLE V

Operating conditions are the same as according to Example I, except that gasoline is used instead of gas oil. Results obtained are summarized below:

Table V

| Speed of the pump (revolutions per minute) | Discharge rate (cm.³/min.) | | | Share of the carburating fraction (percent of total charge injected) |
|---|---|---|---|---|
| | Igniting Injection | Carburating Injection | Total Injection | |
| 1,000 | 180 | 72 | 252 | 28.6 |
| 900 | 166 | 62 | 228 | 27.2 |
| 800 | 154 | 48 | 202 | 23.8 |
| 700 | 140 | 32 | 172 | 18.6 |
| 600 | 126 | 21 | 147 | 14.3 |

EXAMPLE VI

Operating conditions are the same as according to Example II, except that gasoline is used instead of gas oil. Results are given in the following table:

Table VI

| Speed of the pump (revolutions per minute) | Discharge rate (cm.³/min.) | | | Share of the carburating fraction (percent of total charge injected) |
|---|---|---|---|---|
| | Igniting Injection | Carburating Injection | Total Injection | |
| 1,000 | 174 | 86 | 260 | 33.1 |
| 900 | 156 | 78 | 234 | 33.3 |
| 800 | 144 | 64 | 208 | 30.8 |
| 700 | 133 | 47 | 180 | 26.1 |
| 600 | 122 | 33 | 155 | 21.3 |

EXAMPLE VII

Operating conditions are the same as according to Example III, except that gasoline is used instead of gas oil. Results obtained are summarized in the following table:

Table VII

| Speed of the pump (revolutions per minute) | Discharge rate (cm.³/min.) | | | Share of the carburating fraction (percent of total charge injected) |
|---|---|---|---|---|
| | Igniting Injection | Carburating Injection | Total Injection | |
| 1,000 | 158 | 106 | 264 | 40.2 |
| 900 | 144 | 95 | 239 | 39.8 |
| 800 | 129 | 81 | 210 | 38.6 |
| 700 | 115 | 68 | 183 | 37.2 |
| 600 | 98 | 60 | 158 | 38.0 |

EXAMPLE VIII

Operating conditions are the same as according to Example IV, except that gasoline is used instead of gas oil. Results are summarized in the following table:

Table VIII

| Speed of the pump (revolutions per minute) | Discharge rate (cm.³/min.) | | | Share of the carburating fraction (percent of total charge injected) |
|---|---|---|---|---|
| | Igniting Injection | Carburating Injection | Total Injection | |
| 1,000 | 150 | 114 | 264 | 43.2 |
| 900 | 139 | 99 | 238 | 41.6 |
| 800 | 122 | 91 | 213 | 42.7 |
| 700 | 104 | 80 | 184 | 43.4 |
| 600 | 90 | 69 | 159 | 43.4 |

A comparison of the results given in the preceding tables, clearly leads to the following conclusions:

(a) The total amount of fuel injected, for a given type of fuel and a given speed of the pump is practically independent of the internal section of the calibrated narrowing. This is an important feature of the invention providing a noticeable advantage in that any change in the calibration of the narrowing, or of an equivalent section-limiting device, does not require any other changes in the control of the pump and/or the injectors.

(b) Changes in the calibration of a section-limiting device would result in corresponding changes of the share of the "carburating" fraction which are in direct relation with the former, i.e. the two variations are in the same direction.

The lower the ratio of the calibrated section of the section-limiting device to the section of the pipe, the more important are the corresponding changes in the share of the "carburating" fraction; all other conditions being substantially unchanged. The higher the speed of the pump, the lower are the changes in the share of the carburating fraction corresponding to a given change of the section of the section-limiting device.

(c) With a section-limiting device having a given section, the higher the speed of the pump the greater the share of the carburating fraction.

The effect of the speed of the pump (number of revolutions per minute) is much more important with gasoline than with gas-oil used as fuel for operating the engine. This effect is significantly greater when using narrowings of very reduced passage section than when the internal section of the narrowing of the interconnecting pipe is not so reduced.

The preceding tests demonstrate the possibility of adjusting, by means of an appropriate selection of the section of the limiting-section device, the share of the carburating portion of the fuel charge to its optimal value, the kind of fuel used and the most frequent speed of the pump usually applied, being taken into account for the determination of this optimal value.

It will be understood that, while there have been given herein certain specific examples of the apparatus and use of this invention, it is not intended thereby to have this invention limited to the specific details of materials, proportions or conditions herein specified, in view of the fact that this invention may be modified according to individual preference or conditions without necessarily departing from the spirit of this disclosure and the scope of the appended claims. It will further be understood that this invention is susceptible to modification in order to adapt it to different usages and conditions and, accordingly, it is desired to comprehend such modifications within this invention as may fall within the scope of the appended claims.

What we claim is:

1. A double-injection device applicable to internal combustion engines of the compression ignition type having an even number of cylinders and pistons therein and provided with an injection pump of the conventional type having the same number of cylinders as the engine, a plurality of injectors associated with said cylinders of said engine, and a plurality of delivery pipes connecting each of said cylinders of said pump to a corresponding cylinder of said engine, and comprising a plurality of tubular cross-connections between every two of said delivery pipes feeding said injectors associated with those of said cylinders of said engine in which said pistons are in the same position relative to said cylinders of said engine.

2. A double-injection device applicable to internal combustion engines of the compression ignition type having an even number of cylinders and pistons therein and provided with an injection pump of the conventional type having the same number of cylinders as the engine, a plurality of injectors associated with said cylinders of said engine, and a plurality of delivery pipes connecting each of said cylinders of said pump to a corresponding cylinder of said engine, and comprising a plurality of tubular cross-connections between every two of said delivery pipes feeding said ejectors associated with those of said cylinders of said engine in which said pistons are in the same position relative to said cylinders of said engine, and one section-limiting means each provided in one of said tubular cross-connections.

3. A double-injection device applicable to internal combustion engines of the compression ignition type having an even number of cylinders and pistons therein and provided with an injection pump of the conventional type having the same number of cylinders as the engine, a plurality of injectors associated with said cylinders of said engine, a plurality of delivery pipes connecting each of said cylinders of said pump to a corresponding cylinder of said engine, and comprising a plurality of tubular cross-connections between every two of said delivery pipes feeding said injectors associated with those of said cylinders of said engine in which said pistons are in the same position relative to said cylinders of said engine, and one calibrated section-limiting means each provided in one of said tubular cross-connections.

4. A double-injection device applicable to internal combustion engines of the compression ignition type having an even number of cylinders and pistons therein and provided with an injection pump of the conventional type having the same number of cylinders as the engine, a plurality of injectors associated with said cylinders of said engine, a plurality of delivery pipes connecting each of said cylinders of said pump to a corresponding cylinder of said engine, and comprising a plurality of tubular cross-connections between every two of said delivery pipes feeding said injectors associated with those of said cylinders of said engine in which said pistons are in the same position relative to said cylinders of said engine, and one adjustable, calibrated section-limiting means each provided in one of said tubular cross-connections.

No references cited.